United States Patent
Wallace

(10) Patent No.: US 12,025,076 B1
(45) Date of Patent: Jul. 2, 2024

(54) ANNULAR VORTEX TANK VALVE FOR ROCKET MOTOR AND CONFIGURATION IN A ROCKET

(71) Applicant: VAYA SPACE, INC., Cocoa, FL (US)

(72) Inventor: Kineo Wallace, Cocoa Beach, FL (US)

(73) Assignee: VAYA SPACE, INC., Cocoa, FL (US)

( * ) Notice: Subject to any disclaimer, the term of this patent is extended or adjusted under 35 U.S.C. 154(b) by 0 days.

(21) Appl. No.: 18/396,488

(22) Filed: Dec. 26, 2023

Related U.S. Application Data

(60) Provisional application No. 63/436,385, filed on Dec. 30, 2022.

(51) Int. Cl.
| | |
|---|---|
| F02K 9/58 | (2006.01) |
| B64G 5/00 | (2006.01) |
| F02K 9/42 | (2006.01) |
| F02K 9/44 | (2006.01) |
| F02K 9/76 | (2006.01) |

(52) U.S. Cl.
CPC ............... *F02K 9/44* (2013.01); *B64G 5/00* (2013.01); *F02K 9/425* (2013.01); *F02K 9/58* (2013.01); *F02K 9/76* (2013.01); *Y10T 137/87088* (2015.04); *Y10T 137/87153* (2015.04); *Y10T 137/87764* (2015.04)

(58) Field of Classification Search
CPC ............... F15D 1/14; Y10T 137/87708; Y10T 137/87764; Y10T 137/87153; F02K 9/42; F02K 9/56; F02K 9/58; F02K 9/605; F02K 9/76; F02K 9/766; B64G 5/00; B64G 1/002; B64G 1/402

See application file for complete search history.

(56) References Cited

U.S. PATENT DOCUMENTS

| | | | | |
|---|---|---|---|---|
| 3,434,287 A | * | 3/1969 | Caveny | ............... F02K 9/82 |
| | | | | 60/228 |
| 4,723,736 A | * | 2/1988 | Rider | ............... F02K 9/605 |
| | | | | 244/171.1 |
| 10,717,552 B2 | * | 7/2020 | Yhuellou | ............... F02K 9/58 |

OTHER PUBLICATIONS

English translation of the International Search Report and Written Opinion of the International Searching Authority for International Application No. PCT/US 23/85966, dated Apr. 26, 2024.

* cited by examiner

*Primary Examiner* — Kyle Robert Thomas
(74) *Attorney, Agent, or Firm* — Birch, Stewart, Kolasch & Birch, LLP

(57) ABSTRACT

A rocket engine is provided with a propellant valve controlling the output of a propellant tank. The valve is configured to induce a vortex in the propellant as it passes the propellant valve. Plural rocket engines may be supplied by a single valve, the valve inducing a vortex in the propellant which is then supplied to plural propellant lines configured to enhance the vortex induced by the valve.

14 Claims, 5 Drawing Sheets

ANNULAR VORTEX TANK VALVE FOR ROCKET MOTOR AND CONFIGURATION IN A ROCKET

The present invention is focused on improving flow of a fuel or oxidizer (hereinafter "propellant") from a storage tank to several thrust producing engines in a rocket propulsion engine such as that used in satellite launch vehicles. The configuration reduces the introduction of gaseous vapors into the propellant lines to stabilize combustion and attendant thrust and to increase dynamic pressure on an input of a propellant pump

BACKGROUND AND SUMMARY OF THE INVENTION

Liquid propellant-based space faring vehicles such as rockets require a consistent and reliable supply of liquid propellant. If vaporous gasses are allowed to pass from supply tanks to the primary feed plumbing or engine components as unpredicted or inconsistent thermo-fluid, pressure, or mass flow there maybe undesirable and potentially dangerous effects on engine performance such as low engine performance or even catastrophic failure. Current state of the art rocket engine tanks are designed to suppress the formation of vortex flow into the drain of the tank through the use of anti-vortex baffles as disclosed in published application US2003/0196705A1. Additionally, to maintain stability of a space bound launch vehicle, the sloshing of the liquid propellants must be suppressed to prevent the formation of a controls feedback loop that can cause vehicle instability. This fluid slosh is traditionally combated through the use of baffles as disclosed in U.S. Pat. No. 3,110,318A and U.S. application 62/202,87B1 where baffles are placed perpendicular to the primary axis of motion of the rocket so as to dampen the oscillation of the fluid rushing back and forth along the primary axis of the vehicle.

When working with a traditional plumbing approach the primary on/off valve is typically a ball or butterfly valve that controls the primary flow to each of plural engines. When working with modern day Automated Flight Termination systems it is desirable to have a single shutoff valve operating to control all engines so that, in the event of flight termination, all engines shut down at the same time. A single valve controlling all engines during a burn reduces the risk that one of the valves fails to completely shut and thus one engine fails to shut down completely.

An additional disadvantage of traditional valves is that they are large, bulky, and require large systems to actuate them when the desired plumbing size is greater than about 3 inches in diameter. When using these valves as the main control for a clustered rocket additional plumbing needs to be placed before the valve to attach to the tank; after the valve a large distribution block is necessary to evenly distribute the propellant between each of the engines in the cluster. The result is that the primary feed, valve, and distribution plumbing between the tank and the individual lines for each engine and the tank takes up a large amount of space inside of the body of a rocket. This large area requirement increases the size and mass of the rocket which increases the overall amount of propellant required to take a payload to a desired orbit.

The disadvantages of prior systems are overcome by the present application which discloses a propellant tank valve for using in a rocket engine, the propellant tank valve being adapted with plural output ports for plural propellant lines for attachment to plural rocket motors, the propellant tank valve being adapted for mounting to a single propellant tank adapted to supply propellant to each of said motors from the single tank, the propellant valve being configured to be operatively connected to the single propellant tank and controlling the transfer of propellant from the single propellant tank to plural engines;

said tank being configured to connect to plural propellant lines, each extending from the propellant valve to one of said plural engines, the propellant valve producing an induced vortex around a periphery of the valve with each propellant line supplying the propellant to one of said plural engines in a direction generally aligned with the periphery of the vortex induced within the single propellant valve.

The propellant valve may further engage an annular manifold arranged concentrically around a centerline of the propellant tank and include a moveable valve face, the valve face being generally concentric to the annular manifold, the valve face being moveable to selectively vary the opening between the propellant tank and annular manifold.

The propellant valve may be further provided with a propellant tank fill port generally concentric to said annular manifold, the fill port including a propellant tank fill valve sealing the fill port in the propellant tank. The propellant valve may be used in a rocket to be launched from a launch platform, the launch platform including a propellant transfer valve, the fill valve being configured to interact with the propellant transfer so that when the rocket is mounted to the launch platform, the propellant transfer valve and fill valve interact to hold both valves open to facilitate transfer of the propellant from the platform to said rocket when said rocket is mounted to the platform. Such a rocket when launched from the launch pad may cause the propellant transfer valve and fill valve to close by the relative movement therebetween. In this case the weight of the rocket may be utilized to hold the propellant transfer valve and fill valve open.

The vortex induced in the valve attenuates sloshing and.or vapor ingestion when the propellant is dispensed to the rocket engine A single propellant valve may be used I a rocket having plural engines supplied by a single propellant tank, the single propellant valve being operatively connected to the single propellant tank and controlling the transfer of propellant from the single propellant tank to each of the plural engines; where plural propellant lines extending from the single propellant valve to each of said plural engines, the propellant valve producing an induced vortex around a periphery of the valve with each propellant line supplying the propellant to one of said plural engines in a direction generally aligned with the periphery of the vortex induced within the single propellant valve.

The rocket may further include an annular manifold arranged concentrically around a centerline of the propellant tank and a moveable valve face, the valve face being generally concentric to the annular manifold, the valve face being moveable to selectively vary the opening between the propellant tank and annular manifold.

The rocket may be further provided with a propellant tank fill port generally concentric to said annular manifold, the fill port including a propellant tank fill valve sealing the fill port in the propellant tank.

The rocket may be launched from a launch platform including a propellant transfer valve, the propellant transfer valve being configured to interact with the fill valve so that when the rocket is mounted to the launch platform, the propellant transfer valve and fill valve interact to hold both valves open to facilitate transfer of the propellant from the platform to said rocket when said rocket is mounted to the platform. Upon launch, the movement of the rocket with respect to the launch pad may cause the propellant transfer valve and fill valve to close by the relative movement therebetween. In this configuration, the weight of the rocket on the launch pad may hold the propellant transfer valve and fill valve open.

The vortex induced in the valve according to the present invention attenuates sloshing and/or vapor ingestion in the propellant.

While certain embodiments are disclosed in the present application, still other embodiments will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF DRAWINGS

The above-described features and characteristics of the present disclosure will become more apparent to those skilled in the art from a study of the following Detailed Description in conjunction with the appended claims and drawings, all of which form a part of this specification. In the drawings:

The above-described figures depict exemplary configurations for a system or apparatus of the disclosure, which is done to aid in understanding the features and functionality that can be included in the systems described herein. The scope of the present application is not restricted to the illustrated architectures or configurations, but can be implemented using a variety of alternative architectures and configurations as would occur to an artisan experienced in this technology.

DETAILED DESCRIPTION OF PREFERRED EMBODIMENTS

The present disclosure is directed to an apparatus that, in the preferred embodiment, incorporates vapor ingestion suppression, slosh suppression, main propellant fill, thrust termination, and main valve control all into one component. This is achieved through the use of an annular vortex valve port. Much like a drain plug in a normal household sink the valve acts as a plug to control the amount of fluid allowed to pass into the primary feed. Below the "plug" an annular ring is provided that has a plurality of tangential output ports that induce a forced vortex flow-field inside of the main tank. This vortex is a controlled vortex that increases dynamic pressure into the drain ports as compared to a conventional valve. An important feature of such a annular vortex valve is to prevent gas ingestion through the drain. Additionally, the vortex flow suppresses the oscillation of fluid up and down along the primary axis of the rocket thrust and the tank. Additionally, this annular manifold acts as the primary distribution manifold to feed the propellant to all of the engines on the vehicle. Due to the radial outflow of the propellent the dynamic pressure increases the amount of total pressure applied to the fluid which increases the fluid head that goes into the engines thus further improving the efficiencies of pumps and injectors in the system.

Figure 1:
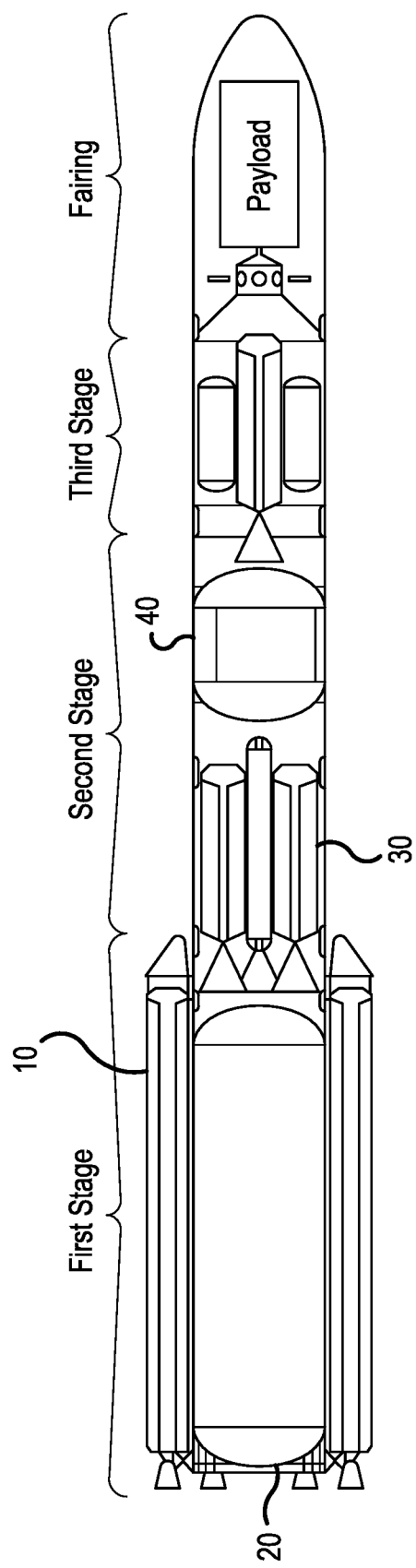
FIG. 1 is a schematic representation of a multistage rocket having a first stage and a second stage.

FIG. 1 is a representation of a multistage rocket having a first stage and a second stage that each utilize multiple rocket engines (10 in the First Stage and 30 in the Second Stage) supplied propellant from a single propellant tank (20 in the First Stage and 40 in the Second Stage). In such a rocket it is desirable to control the multiple rocket engines within a single stage with a single valve according to the teachings of the present application.

Figure 2:
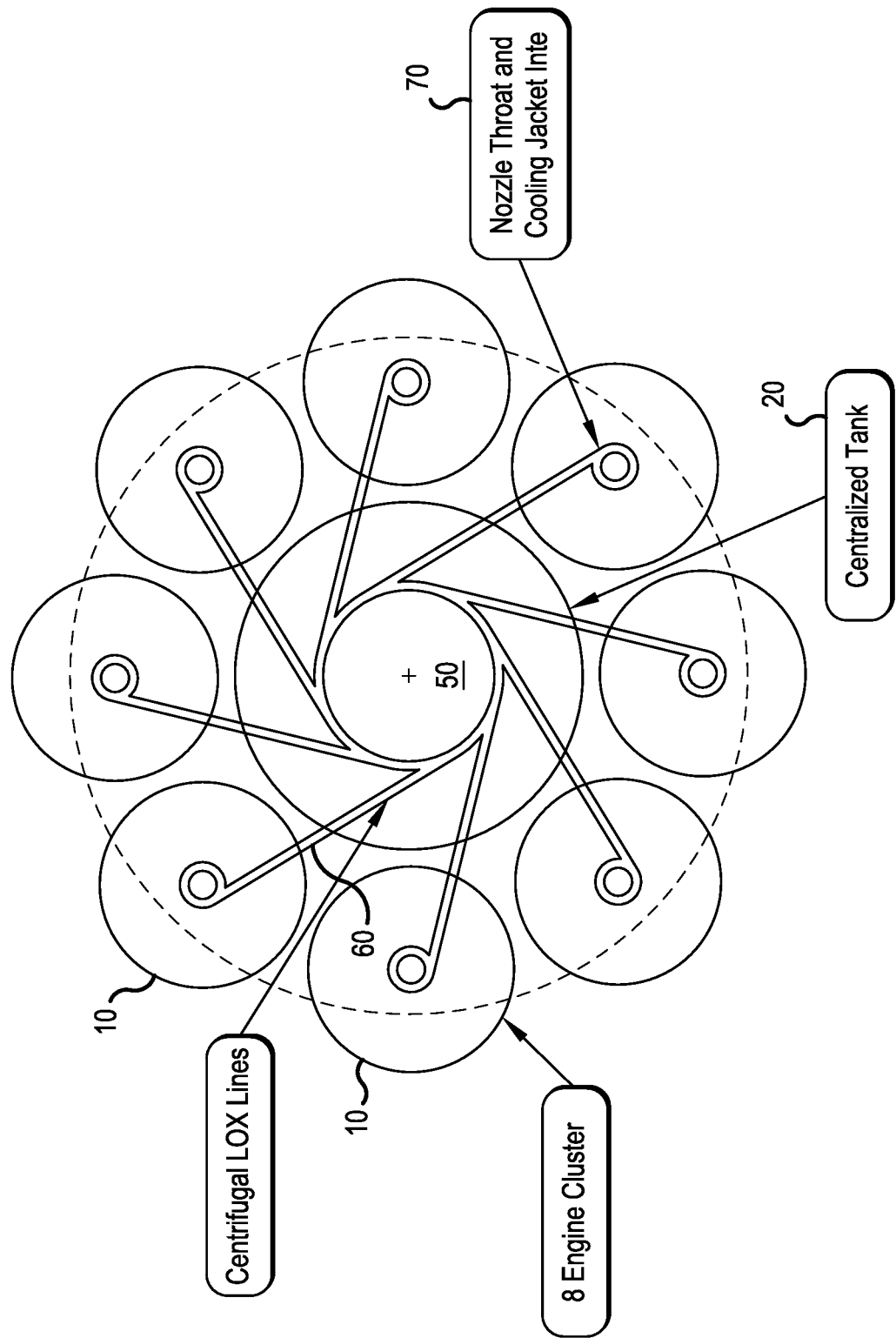
FIG. 2 is a schematic sectional bottom view of a Vortex Tank Port of the type supplying propellant in one embodiment of the present application.

FIG. 2 schematically discloses the use of a Vortex Tank Port of the type contemplated in the present application supplying propellant in one embodiment of the present application. FIG. 2 is numbered with the numbers from the First Stage in FIG. 1. In this example, 8 hybrid rocket engines 10 using a solid fuel and liquid Oxygen oxidizer (propellant) are supplied from a single vortex propellant valve 50 and propellant (in this case LOX) tank 20 centrally located such as disclosed in Stage 1 of FIG. 1. Note that the centrifugal propellant supply (in this example LOX) lines 60 supply each engine from the single vortex valve 50 located at the bottom of the propellant tank 20 as illustrated in FIG. 1.

Figure 3:
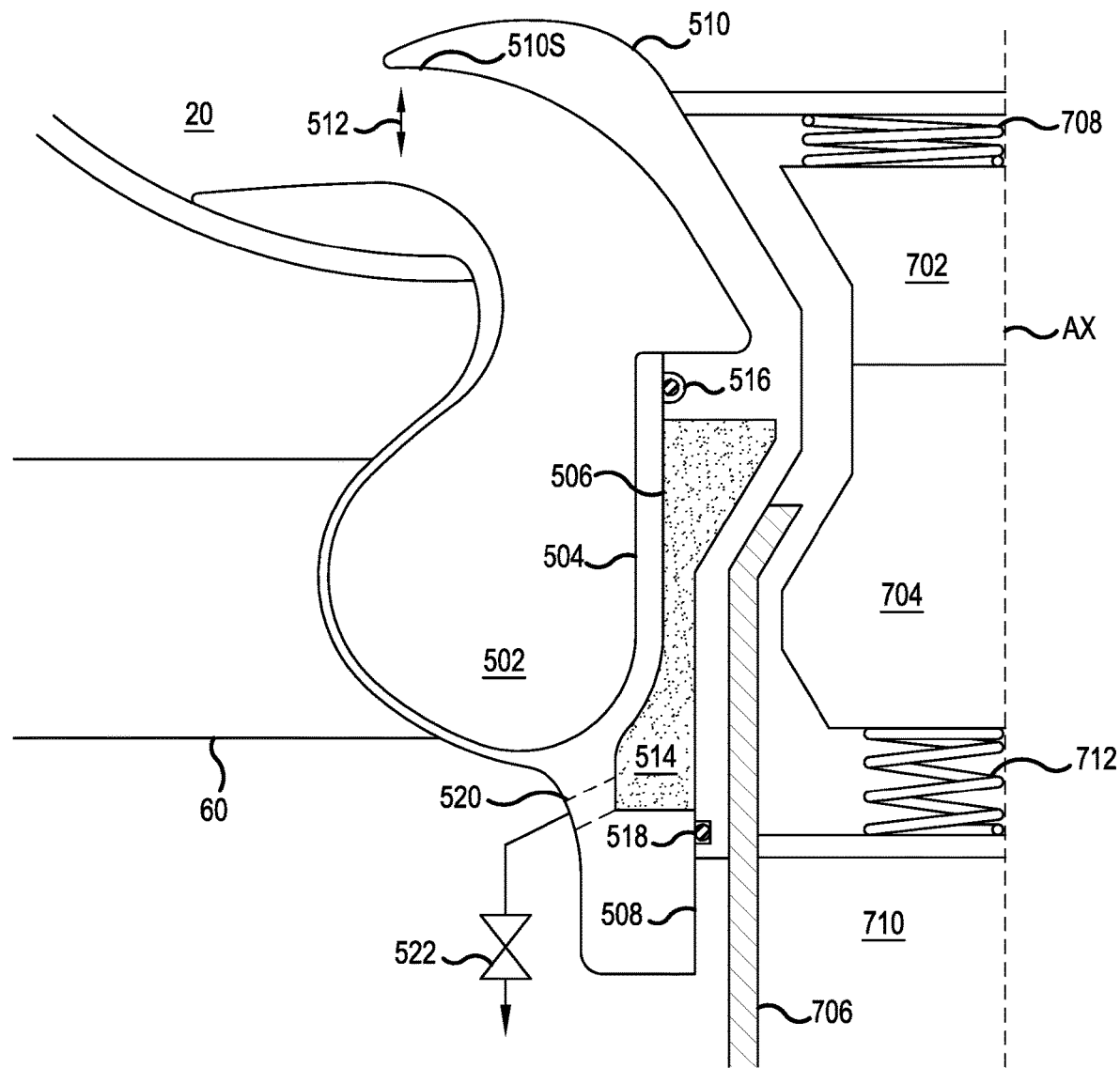
FIG. 3 is a partial sectional side view of one embodiment of a vortex valve 50 such as that provided in the central position of FIG. 2.

FIG. 3 is a partial sectional view of one embodiment of a vortex valve 50 such as that provided in the central position of FIG. 2. The image of FIG. 3 is one half of a vortex valve according to one embodiment of the invention where the valve structure is symmetrical as rotated around a central axis AX. This valve is desirably provided in the center of the bottom of the propellant tank. It should be understood that the valve in this embodiment is symmetrical with respect to the dashed central axis AX which is typically aligned below and with the central axis of the propellant tank. The structure of FIG. 3 includes an annular manifold/valve body 502 with the individual engine supply ports 60 being generally equally-spaced around the outer periphery of the manifold. It is apparent that the manifold is annular and has an inner annular wall 504 closest to the central axis AX. As illustrated in FIG. 3, an annular displaceable valve 510 is provided concentric to the annular manifold 502. The inner annular wall 504 is parallel to the central axis and its inner annular wall inner surface 506 is provided in parallel to a second cylindrical surface 508. The inner annular wall inner surface 506 and second cylindrical surface 508 are concentrically parallel and interact with the annular displaceable valve 510 to provide surfaces to facilitate slidable movement of the displaceable valve 510 to allow the valve to be adjusted between a closed position with a sealing surface 510S to close the opening between the tank 20 and the annular manifold 502. Seals 516 and 518 are provided to allow the displaceable valve 510 to slideably and sealingly adjust flow from the tank 20 to the annular manifold/valve body 502 from a closed to open position by movement along line 512 to vary the flow of liquid from the tank. The opening from the tank 20 to the annular manifold/valve body 502 is thereby controllably varied to provide a swirling and generally laminar flow out of the tank 220 and along the individual engine supply ports 60.

The valve of FIG. 3 may be controlled in any suitable fashion. In the example of FIG. 3, the slidable movement of a valve head along the parallel surfaces is effected by introducing a hydraulic fluid into a control cavity 514 using a hydraulic inlet port 520 under control of a control valve 522 that is opened under positive pressure to introduce fluid to open the valve and is then opened under negative pressure to vent the hydraulic fluid to close the valve. Note that by use of a single valve for all of the engines within a single stage as illustrated in FIG. 2, all of the engines of a single stage are controlled together so that all engines within a stage are throttled or shut down at the same time as is typically considered desirable.

The introduction of the swirl imparted into the liquid propellant by the annular valve reduces the possibility that gaseous propellant will be introduced into one or more engines, potentially causing unstable thrust or even catastrophic explosive forces caused by undesired introduction of gaseous propellant to the engines from the propellant tank.

In many circumstances, it is desirable to fill the propellant tank after the rocket is installed on the launch platform. According to the teachings of the present application a quick detach fill valve system 700 is provided to fill the propellant tank 20 at this time. In the embodiment of FIG. 3, the quick detach fill valve 700 is provided on the central axis of the annular displaceable valve 510. A propellant tank filling apparatus is provided with a fill port 708 intended to be separate from the rocket which, when the rocket is placed on the launch pad interacts with a tank fill port 702 on the propellant tank to ensure the tank may be filled. In FIG. 3, a sidewall 706 of the propellant supply port 708 provided on the launch pad slideably inserts into a recess in the vortex valve of FIG. 3. In accordance with one embodiment of the invention, a hydraulic quick coupling produced according to ISO 7241-1 may be utilized. A slideable supply valve 704 closes the propellant supply port 708 when the rocket is not fully mounted to the launch pad to seal the propellant supply port 708 on the launch pad in the absence of a launch vehicle. The propellant tank 20 of the launch vehicle may be provided with a propellant tank supply valve 702 which interacts with the slideable supply valve 704 provided on the launch pad so that when the rocket is fully mounted on the launch pad the propellant tank supply valve 702 and the slideable supply valve 704 hold each other open to allow the tank to be filled.

As soon as the rocket leaves the launch pad both of these valves are closed by their respective biasing systems, in the case of FIG. 3, the propellant tank biasing spring 710 of the propellant tank supply valve of the launch vehicle and propellant supply port biasing spring 712 of the propellant supply port 708 of the launch pad to seal the propellant tank 20 and the propellant supply port 708 as soon as the launch vehicle leaves the launch pad.

Figure 4:
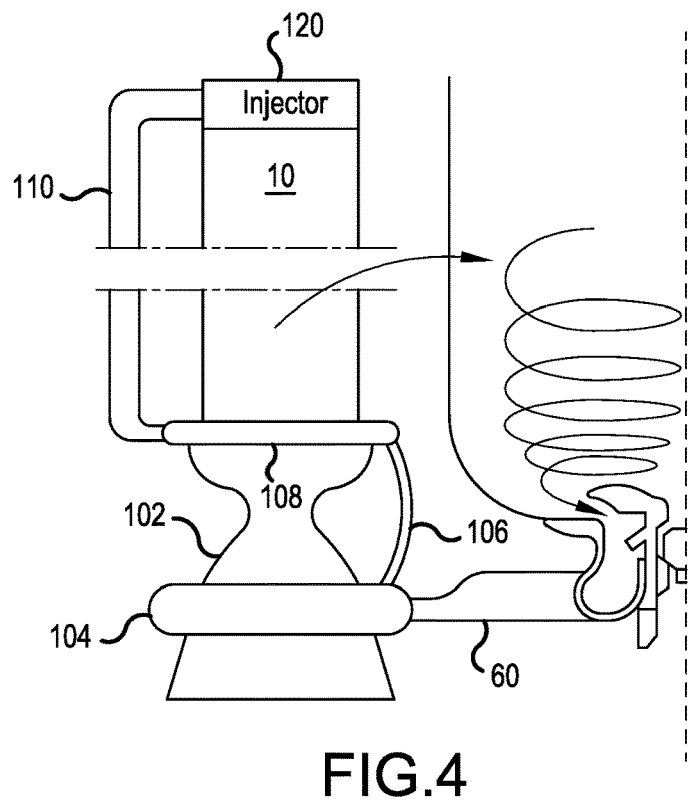
FIG. 4 is a partial sectional side view showing a simplified valve assembly of FIG. 3 interacting with a single rocket engine 10.
Figure 5:
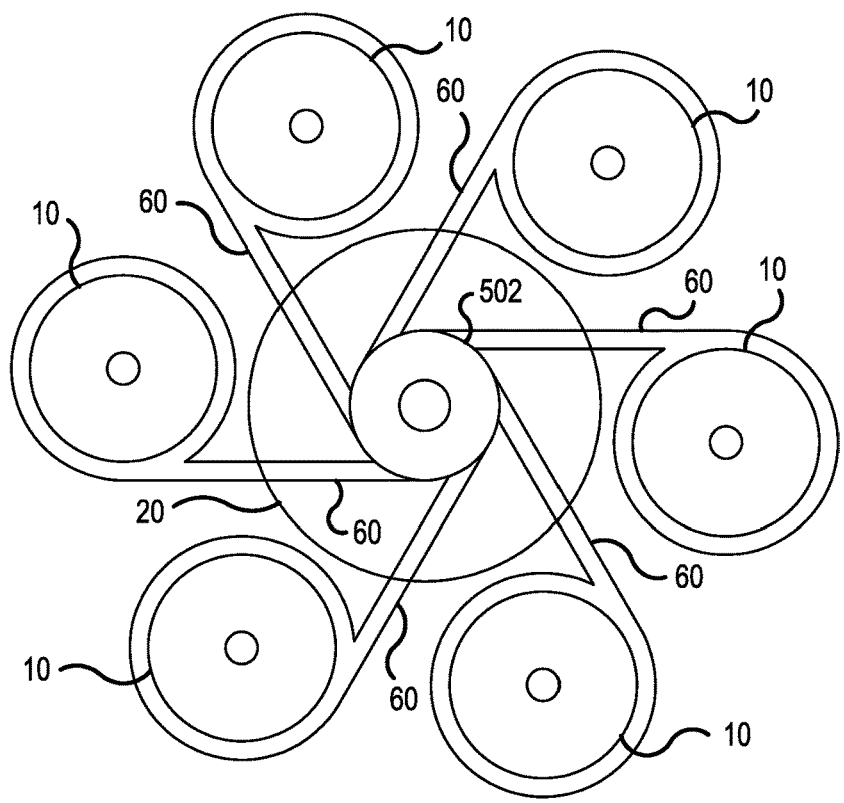
FIG. 5 is a representative bottom view of the illustration of FIG. 4 showing the vortex inducing swirl for one engine as a section orthogonal to the axis of the valve assembly.

FIG. 4 is a side view showing a simplified valve assembly of FIG. 3 interacting with a single rocket engine 10. FIG. 5 is a representative bottom view of the illustration of FIG. 4 showing the vortex inducing swirl for one engine as a section orthogonal to the axis of the valve assembly. The propellant tank and vortex tank valve in FIG. 4 are the same as that shown in FIG. 3. FIG. 4 further illustrates an exemplary one of the rocket engines 10 including one of the centrifugal propellant supply lines 60 supplying the illustrated rocket engine 10. In the embodiment shown, the Propellant supply line 60 feeds the propellant, in this case LOX, to an annular manifold 104 that feeds the nozzle cooling channels configured around the outside of a nozzle 102 of the rocket engine 10. These channels function to cool the nozzle and preheat the propellant being thereafter supplied to the injector of the rocket engine 10.

In the embodiment of FIG. 4, 5, the propellant is fed to an annular cooling channel 104 provided at the downstream end of the rocket engine 10. An example of such a rocket engine is explained in my published application 2020/0063692, published Feb. 27, 2020 and entitled "Linear Throttling High Regression Rate Vortex Plos Field Injection System Within a Hybrid Rocket Engine", now allowed. The contents of this application are hereby incorporated by reference.

In FIG. 4 the propellant received from the propellant supply line 60 is provided by a propellant supply line 106 to an second annular nozzle cooling channel 108 provided at the base of the fuel grain to further preheat the propellant which is then supplied to an injector 120 of the type described in the afore-mentioned application by an injector feed line 110.

It should be understood that the principals of the present application may be used with any suitably configured rocket engine which need not be a Hybrid engine configured as disclosed in this published application. For example, the principals of the present application are usable with liquid rocket engines and may provide either a fuel or oxidizer. Further, the output of the propellant supply line 60 may be fed directly to the injector 120 bypassing one or more of the annular cooling channels.

Figure 6:
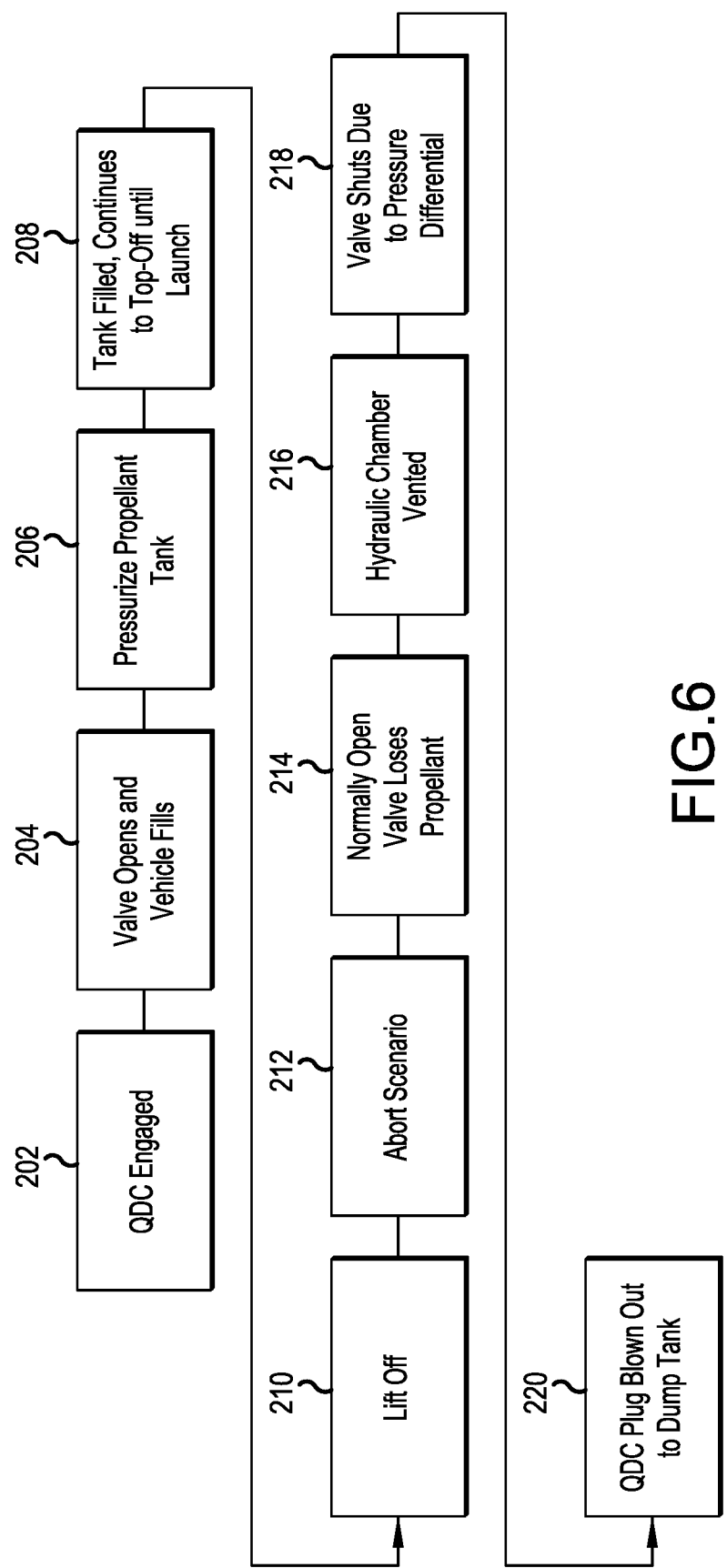
FIG. 6 is a flowchart illustrating the operation of the system of the present application.

FIG. 6 is a flowchart illustrating the operation of the system of the present application. Steps 202, 204, 206 and 208 are provided during launch while steps 212, 214, 216, 218 and 220 are employed only in case of aborting the launch, typically as a result of an emergency. The FIG. 6 flowchart is initiated after the rocket is mounted to the launch pad, In FIG. 3, the sidewall 706 of the propellant supply port 708, slideable supply valve 704 closes the propellant supply port 708 when the rocket is not fully mounted to the launch pad to seal the propellant supply port 708 on the launch pad. The tank is provided with a propellant tank supply valve 702 which interacts with the slideable supply valve 704 normally provided on the launch pad so that when the rocket is fully mounted on the launch pad the propellant tank supply valve 702 and the slideable supply valve 704 hold each other open to allow the tank to be filled. This engagement occurs in a QDC engaged step 202. The valve 522 is controlled to close the vortex propellant valve 50 (the displaceable valve 510) by removing hydraulic fluid from the control cavity 514 at this time so that the propellant is sealed within the propellant tank 20. A valve on the launch pad then opens to begin filling the propellant tank 20 with propellant through the propellant tank supply valve 702 during step 204.

Throughout launch, in step 206 the propellant tank supply valve 702 and slideable supply valve 704 fill the propellant tank and may beneficially remain open in step 208 to continue the process of supplying propellant to the rocket while on the launch pad. This continues up until lift off where the separation of the propellant tank supply valve 702 and slideable supply valve 704 causes both valves to return to a normally closed position, thereby retaining all of the propellant in the tank until dispensed though the displaceable valve 510 to the annular manifold 502 as previously described. At this point the engine thrust may be controlled though modulating the valve 522 and pressure within control cavity 514 to displace the displaceable valve 510 to dispense the desired amount of propellant. This is typically done under control of control logic (not shown) which may be mounted within the rocket or provided from the ground though appropriate telemetry.

In the unfortunate occurrence that the launch is to be aborted, the system of the present application facilitates an abort procedure, handled beginning at step 212 where the valve 702 may be controlled to vent the propellant tank. This occurs by removing power from the actuator of the normally open propellant tank supply valve 702 to vent the entirety of the propellant tank 20. At step 214, the valve 522 is opened and the hydraulic fluid is removed from the control cavity 514 to close the vortex propellant valve 50 by closing the displaceable valve 510. At step 516, the propellant tank supply valve 702 is opened to vent the propellant tank 20. The valve 522 is opened at step 214 and the fluid is bled from the control cavity 514 due to a pressure differential between the interior of the tank and the atmosphere at step 218. At step 220 the propellant supply valve 702 is opened, typically explosively blown (or otherwise removed or opened), thereby venting the propellant tank 20 to reduce the potential explosive danger produced by retention of the propellant. Updated comments to incorporate abort system By connecting the valve to the bottom of the tank using a flange or a vband clamp (also known as a marman clamp sec https://en.wikipedia.org/wiki/Marman_clamp) by breaking the bolt using an electromechanical breakaway bolt that would cause the clamp to no longer retain the valve onto the base of the tank. Additionally, in an abort condition, the valve would vent the hydraulic piston which would cause the valve to "slam" shut.

Other embodiments could use explosive bolts to break the clamp or it could be a traditional bolted flange with explosive bolts.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A rocket comprising:
   plural engines;
   a single propellant tank providing propellant;
   a single propellant valve operatively connected to the single propellant tank and controlling
   the transfer of propellant from the single propellant tank to each of the plural engines;
   each of plural propellant lines extending from the single propellant valve to each of said plural engines, the propellant valve configured to produce an induced vortex around a periphery of the valve with each propellant line supplying the propellant to one of said plural engines in a direction generally tangential with the periphery of the vortex induced within the single propellant valve.

2. The rocket of claim 1 wherein said propellant valve includes:
   an annular manifold arranged concentrically around a centerline of the propellant tank;
   a moveable valve face, the valve face being generally concentric to the annular manifold, the valve face being moveable to selectively vary the opening between the propellant tank and annular manifold.

3. The rocket of claim 2 wherein said rocket is further provided with a propellant tank fill port generally concentric to said annular manifold, the fill port including a propellant tank fill valve sealing the fill port in the propellant tank.

4. The rocket of claim 3 wherein said rocket is to be launched from a launch platform, the launch platform including a propellant transfer valve, the propellant transfer valve being configured to interact with the fill valve so that when the rocket is mounted to the launch platform, the propellant transfer valve and fill valve interact to hold both valves open to facilitate transfer of the propellant from the platform to said rocket when said rocket is mounted to the platform.

5. The rocket of claim 3 wherein launch of said rocket from the launch pad causes the propellant transfer valve and fill valve to close by the relative movement therebetween.

6. The rocket of claim 5 wherein the weight of the rocket holds the propellant transfer valve and fill valve open.

7. The rocket of claim 1 wherein the vortex induced in the valve attenuates sloshing and/or vapor ingestion in the propellant.

8. A propellant tank valve for using in a rocket engine, the propellant tank valve being adapted with plural output ports for plural propellant lines for attachment to plural rocket motors, the propellant tank valve being adapted for mounting to a single propellant tank adapted to supply propellant to each of said motors from the single tank,
   the propellant valve being configured to be operatively connected to the single propellant tank and controlling the transfer of propellant from the single propellant tank to plural engines;
   said tank being configured to connect to plural propellant lines, each extending from the propellant valve to one of said plural engines,
   the propellant valve configured to produce an induced vortex around a periphery of the valve with each propellant line supplying the propellant to one of said plural engines in a direction generally tangential with the periphery of the vortex induced within the single propellant valve.

9. The propellant valve of claim 8 including:
an annular manifold arranged concentrically around a centerline of the propellant tank;
a moveable valve face, the valve face being generally concentric to the annular manifold, the valve face being moveable to selectively vary the opening between the propellant tank and annular manifold.

10. The propellant valve of claim 9 wherein said valve is further provided with a propellant tank fill port generally concentric to said annular manifold, the fill port including a propellant tank fill valve sealing the fill port in the propellant tank.

11. The propellant valve of claim 10 wherein said rocket is to be launched from a launch platform, the launch platform including a propellant transfer valve, the fill valve being configured to interact with the propellant transfer so that when the rocket is mounted to the launch platform, the propellant transfer valve and fill valve interact to hold both valves open to facilitate transfer of the propellant from the platform to said rocket when said rocket is mounted to the platform.

12. The propellant valve of claim 10 wherein launch of said rocket from the launch pad causes the propellant transfer valve and fill valve to close by the relative movement therebetween.

13. The propellant valve of claim 12 wherein the weight of the rocket holds the propellant transfer valve and fill valve open.

14. The propellant valve of claim 13 wherein the vortex induced in the valve attenuates sloshing and/or vapor ingestion in the propellant.

* * * * *